US008095420B2

(12) United States Patent
Ruckart

(10) Patent No.: US 8,095,420 B2
(45) Date of Patent: *Jan. 10, 2012

(54) METHODS AND SYSTEMS FOR OFFERING BUNDLED GOODS AND SERVICES

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/954,790

(22) Filed: Dec. 12, 2007

(65) Prior Publication Data

US 2008/0091539 A1    Apr. 17, 2008

Related U.S. Application Data

(63) Continuation of application No. 10/007,552, filed on Nov. 8, 2001, now Pat. No. 7,324,963.

(51) Int. Cl.
*G06Q 30/00* (2006.01)
(52) U.S. Cl. .............. 705/14.34; 705/39; 705/26.1
(58) Field of Classification Search ............ 705/14.39, 705/26.1, 14.34, 39
See application file for complete search history.

(56) References Cited

U.S. PATENT DOCUMENTS

| 5,878,400 | A | * | 3/1999 | Carter, III | 705/20 |
| 6,078,897 | A | * | 6/2000 | Rubin et al. | 705/14.39 |
| 6,343,273 | B1 | * | 1/2002 | Nahan et al. | 705/5 |
| 6,564,189 | B1 | * | 5/2003 | Nycz | 705/20 |
| 6,955,875 | B2 | * | 10/2005 | Rothenberg et al. | 435/6 |
| 6,973,436 | B1 | * | 12/2005 | Shkedi | 705/14.44 |
| 2006/0206385 | A1 | * | 9/2006 | Walker et al. | 705/21 |

FOREIGN PATENT DOCUMENTS

EP    0809387    * 11/1997

OTHER PUBLICATIONS

Sadrian, Amir et al, "Business volume discount: A new perspective on discount pricing" International Journal of purchasing and materials Management Spring 1992.*

* cited by examiner

*Primary Examiner* — Mark Fadok
(74) *Attorney, Agent, or Firm* — Jackson Walker L.L.P.

(57) ABSTRACT

A method and system implementing a variable pricing structure that applies to goods and services available from a vendor, and rewards customers who spend more is described. Customers can select a combination of the offered goods and services offered by a vendor, rather than choosing from among a few, pre-bundled packages. A progressive discount is employed in the determination of the price of the combination, such that increasing the number of goods or services, or increasing the level of service, results in greater discounts. The offering price of this combination is conveyed to the customer, and opportunities to make changes to the selected combination are provided. The opportunity to initiate the purchase of the selected combination is also provided.

20 Claims, 4 Drawing Sheets

| | Product | Base Price ($) $P_i$ | 2 Item Discount Rate $(A_2)_i$ | 3 Item Discount Rate $(A_3)_i$ | 4 or More Item Discount Rate $(A_4)_i$ | |
|---|---|---|---|---|---|---|
| Hardware | Telephone 1 | 20.00 | 5% | 7.5% | 10% | $i = 1$ |
| | Telephone 2 | 80.00 | 10% | 15% | 20% | $i = 2$ |
| | Pager | 6.00 | 10% | 15% | 20% | $i = 3$ |
| | Cell Phone 1 | 70.00 | 5% | 7.5% | 10% | . |
| | Cell Phone 2 | 125.00 | 10% | 15% | 20% | . |
| Services | Local Telephone Service | 13.00/month | 5% | 7.5% | 10% | . |
| | Call Waiting | 6.00/month | 10% | 25% | 40% | . |
| | Caller ID | 6.00/month | 10% | 25% | 40% | . |
| | Voice-mail | 7.00/month | 10% | 25% | 40% | . |
| | Long Distance 1 | 0.40/minute | 5% | 7.5% | 10% | . |
| | Long Distance 2 | 4.95 + 0.07/minute | 5% | 7.5% | 10% | . |
| | Long Distance 3 | 10.00 + 0.05/minute | 5% | 7.5% | 10% | . |
| | International Long Distance | 0.75/minute | 10% | 15% | 20% | . |
| | Cellular Service 1 250 min + 0.20/min thereafter | 30.00/month | 5% | 7.5% | 10% | . |
| | Cellular Service 2 500 min + 0.20/min thereafter | 50.00/month | 5% | 7.5% | 10% | . |
| | Cellular Service 3 1000 min + 0.20/min thereafter | 70.00/month | 5% | 10% | 15% | . |
| | Paging Service | 10.00/month | 20% | 35% | 50% | $i = 17$ |
| | Dial-up Internet Service | 15.00/month | 5% | 7.5% | 10% | $i = 18$ |
| | DSL Internet Service | 50.00/month | 10% | 15% | 20% | $i = 19$ |

Figure 4

METHODS AND SYSTEMS FOR OFFERING BUNDLED GOODS AND SERVICES

CROSS-REFERENCE TO RELATED APPLICATION

This is a continuation of application Ser. No. 10/007,552 filed Nov. 8, 2001 now U.S. Pat. No. 7,324,963, the contents of which are incorporated herein by reference.

BACKGROUND OF THE INVENTION

1. Field of the Invention

The present invention relates generally to methods and systems for marketing and selling goods and services. Certain embodiments relate to methods and systems for maximizing customer choice of goods and services while offering progressive pricing structures.

2. Description of the Background

Many households and businesses use goods and services purchased from several different vendors, even though such goods and services were available from one vendor. For example, in the telecommunications industry, though one vendor may offer wired telephones, local phone service, long distance phone service, pagers, paging services, wireless telephones, and Internet services, a household may purchase these goods and services from various sources. One way to increase a vendors' share of a market is to offer discounts to customers that purchase more than one service or good from the vendor.

There is an increasing trend in the marketplace, particularly in the telecommunications industry, to offer bundled goods and services at a discount in an attempt to capture market share. But several problems arise with such a practice. The creation of bundled offers and their associated price points can be cumbersome when a vendor has a large number of products. Also, communicating such offers to the public becomes increasingly difficult as the number of different package offerings increases.

For example, if a consumer inquires as to the price of long-distance telephone-service, the answer may depend on the current promotion. There may be one price if combined with local-telephone service, another price if combined with wireless telephone service, and yet another price if combined with call waiting and caller ID. And within a particular offering, there may be different levels of service. For example, within wireless telephone service, there may be packages offering two-hundred-fifty, five-hundred, or one-thousand minutes, and additional options of discounted or free nights and weekends or long distance.

Other disadvantages are present in such conventional methods and systems. For instance, the bundling of goods and services as described above reflects choices made available by the provider of the goods and services, and may not coincide with consumer preferences. Additionally, the availability of multiple bundled options may induce consumer confusion, particularly if bundles have common items. Similarly, consumer confusion may result when bundles are modified to reflect new offers.

These and other problems are avoided and numerous other advantages are provided by the methods and systems of the present invention.

SUMMARY OF THE INVENTION

The present invention comprises methods and systems for offering bundled goods and services. One embodiment of the present invention comprises a method and system that offer customers the ability to choose a combination of goods and services available from a vendor, and enables the vendor to employ a variable pricing structure that rewards customer loyalty. The embodiment may gather information about the customer's usage of goods and services of the type offered, and use this information to make recommendations to the customer. In accordance with another more specific aspect, subsequent to a customer's selection of goods and/or services, the method and system may convey an incremental offering price of upgrades to the customer.

One object of the invention is to allow customers to select a combination of goods and services from an array of goods and services offered by a vendor, rather than choosing from among a few pre-bundled packages. Another object is to derive the benefit of a variable pricing structure that rewards customers choosing a greater number, or higher level of goods and services. An additional object of the invention is to ease the marketing burden of vendors who employ a variable pricing structure that rewards customer loyalty by offering a discount to customers who spend more. Rather than attempting to convey information about each specific pre-bundled package, vendors may convey the message that greater numbers, and/or higher levels, of goods and services will result in a greater discount to the customer, all while maintaining complete flexibility of customer choice.

BRIEF DESCRIPTION OF THE DRAWINGS

FIG. 4 is an example of a price data table according to the present invention.

DETAILED DESCRIPTION

Figure 1:
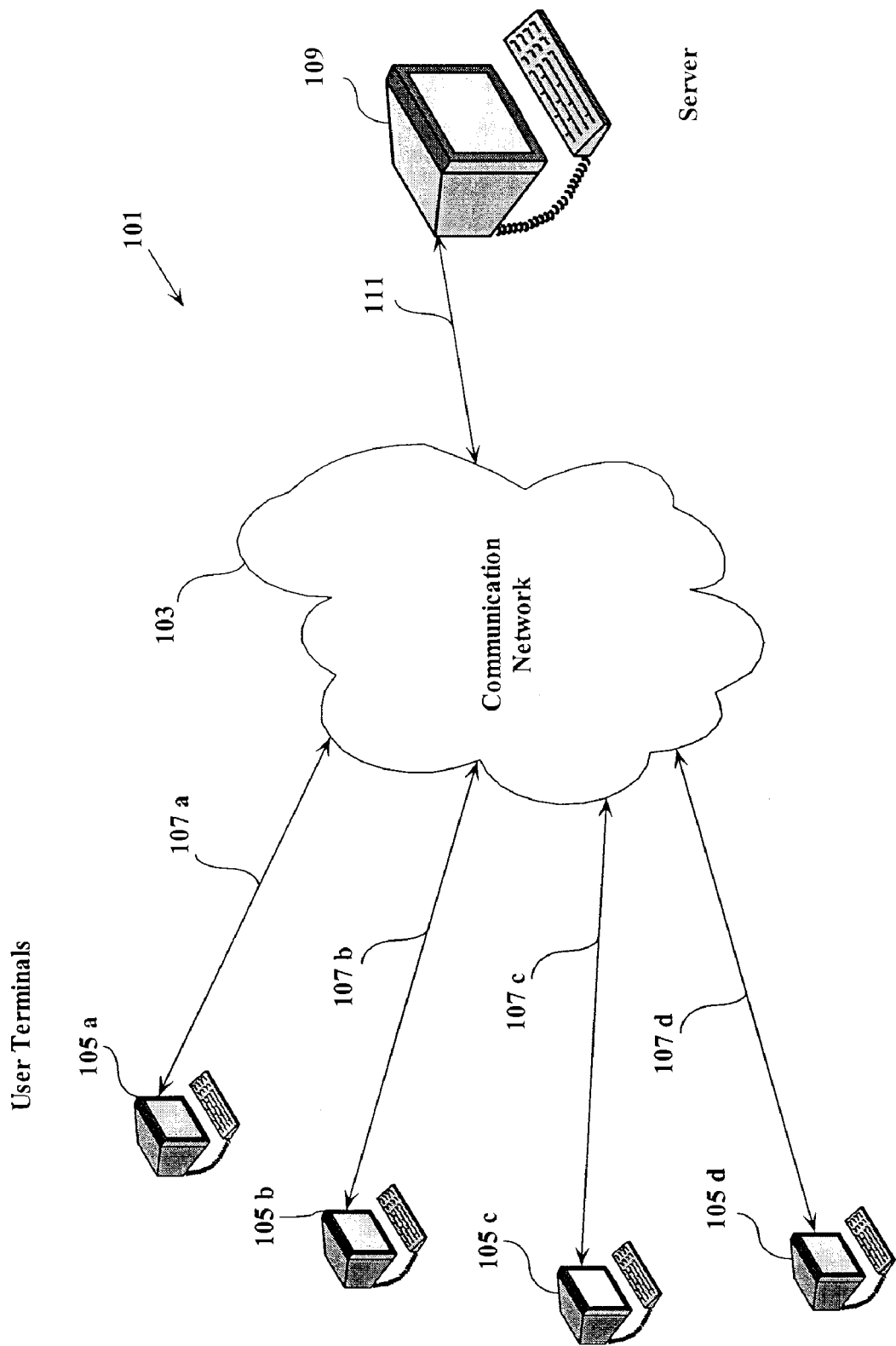
FIG. 1 is a representation of a networked computing environment in which an embodiment of the present invention may be practiced.

An example of a system 101 embodying the present invention is shown in FIG. 1. The system 101 includes a server 109 having a processor and data store associated therewith. The server 109 is configured for connection 111 to a network and is connected to a communication network 103. A plurality of user terminals 105*a*, 105*b*, 105*c*, and 105*d*, are also configured for connection 107*a*, 107*b*, 107*c*, and 107*d* to the network 103 and are connected to the network 103. Each user terminal (collectively 105) has a processors and data store associated therewith. The data stores associated with the server 109, and the user terminals 105 encompass both long-term storage, such as a hard drive, and short term storage, such as random access memory (RAM). The communication network 103 could be any communication network, including a local area network, a wide area network, or the Internet. The server 109 could be any file server, for example: a mainframe computer, an IBM PC or clone running Windows or LINUX, a Macintosh server, Sun or HP servers running Unix or Linux, or an equivalent of the above listed servers. A user terminal 105 could be any computer capable of communicating with a network, including: an IBM PC or clone, a Macintosh, a UNIX workstation, a mainframe terminal, or an equivalent of the above listed computers. Further, each of the user terminals 105*a*, 105*b*, 105*c*, and 105*d*, may be different. All of these configurations, as well as the appropriate communications hardware and software are known in the art.

Software programming code that embodies the present invention is usually stored in permanent media storage of some type, such as the hard drive of a data store associated with a user terminal, such as user terminal 105a. In a client/server environment, such software programming code may be stored in the data store associated with the server 109. The software programming code may be embodied on any of a variety of known media for use with a data processing system, such as a diskette, a hard drive, CD-ROM, or DVD-ROM. The code may be distributed on such media, or may be distributed to users from the data store associated with one computer system over some type of network to other computer systems, for use by users of such other systems. The techniques and methods for embodying software programming code on physical media and/or distributing software programming code via networks are well known in the art.

In accordance with one aspect, the invention can be practiced over a communication network 103. For example, one embodiment comprises a website of a telecommunications vendor served from a web server 109, and accessed by a customer from a remote computer 105a via the Internet 103. For the purposes of this example, communication between the web server 109 and user terminal 105 occurs using standard communication protocols across a communication network 103. Additionally, the website and its associated pages are constructed using standard software techniques. This embodiment is employed as a framework to further describe the invention. One of ordinary skill in the art will appreciate that this is but one of a variety of ways in which this invention may be utilized.

Figure 2:
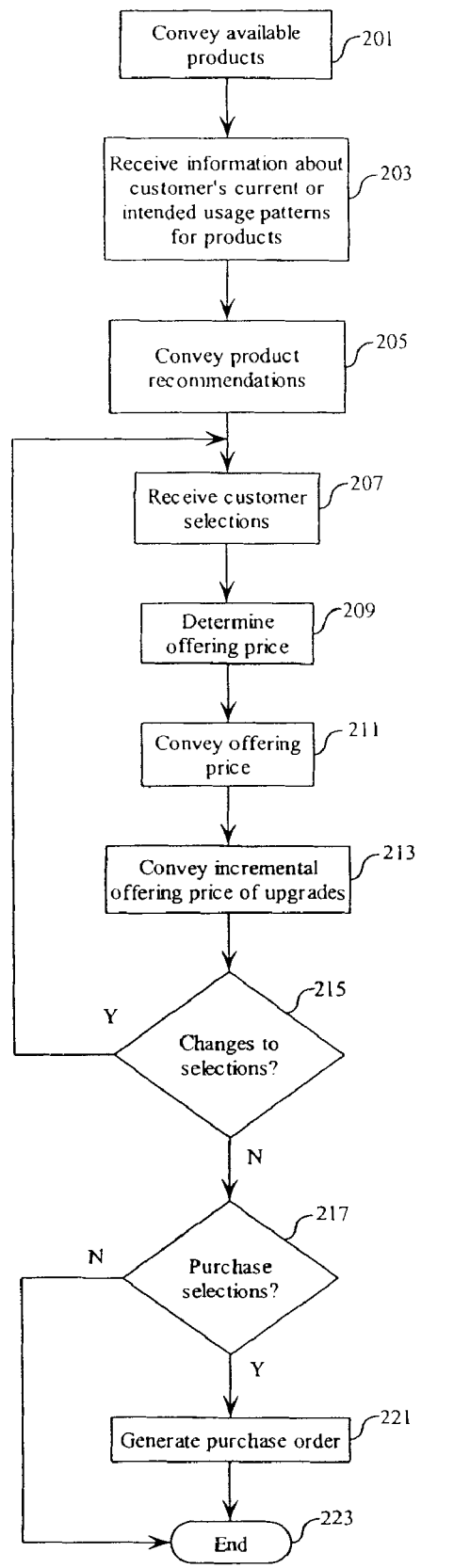
FIG. 2 is a flowchart illustrating the logical steps of a method according to the present invention.

FIG. 2 shows a flow chart depicting a method in accordance with the invention for employing a variable pricing structure that applies to goods and services available from a vendor, and offering customers the ability to choose any combination of offered products. Goods, services, or the combination of goods and services, are hereinafter referred to as products. Such products may include telephones, wireless communication devices, local telephone-services, long distance-telephone services, wireless telephone services, paging services, and Internet services. In one embodiment, the variable pricing structure applies to all products available from the vendor.

The first web page also displays a base price for each product, along with a message indicating that any combination of products is available to the customer. Also incorporated into this message is the indication that, if more than one product is selected, a varying progressive discount from the base prices will be applied to the selections. Further, the message indicates that the discount will be greater if more expensive products are selected. In one embodiment, the act of clicking on the name of a product or an image of a product opens an additional window containing more detailed information about the product. In one embodiment, this detailed product information is accessible throughout the process. For example, all products may be represented in a frame of a web page.

Additionally, the first web page displays several questions regarding the customer's current or intended usage of the available products. After answering the questions, the customer clicks a button that submits the answers, and the web server 109 receives the answers in step 203.

The server 109, by means of standard statistical methods and software techniques, uses the information received in step 203 to predict which products the customer is most likely to use. For example, referring to FIG. 4, there are three domestic long-distance plans offered by the vendor. The base price of the first long-distance plan 417 is a flat rate of $0.40/minute. The base price of the second long-distance plan 419 has an initial fee of $4.95, and a rate of $0.07/minute, and the base price of the third long-distance plan 421 has an initial fee of $10.00, and a rate of $0.05/minute. If the customer responds that she uses less than fifteen minutes of long distance per month, then the server 109 would recommend that the most economical long-distance plan is the flat rate plan 417 (15 minutes*$0.40/minute=$6.00). If the customer responds, however, that she generally uses over three-hundred long distance minutes per month, the server 109 would recommend that the most economical long-distance plan is the third plan 421. (At three hundred minutes, the cost of the third plan 421 is $25.00, the cost of the second plan 419 is $25.95, and the cost of the flat rate plan 417 is $120.00).

The server 109 conveys recommendations for products to the customer's terminal 105a in a second web page in step 205. Also in the second web page, is the order form for the customer to make product selections. After making product selections, for example, by clicking on check boxes, the customer clicks a button that submits the selections, and the web server 109 receives the selections in step 207.

In step 209, the sever determines an offering price for the customer's selections. The process for determining an offering price is described below in more detail. The customer receives the offering price in a third web page in step 211. The third web page also displays the amount of discount, thereby enabling the customer to see the value in selecting the particular selected combination. Additionally, the third web page conveys the incremental price of upgrades to the customer's selections in step 213. Further, in step 215, the third web page provides the customer an opportunity to make changes to the previous selections.

If the customer decides to make changes to the previous selections, the process returns to step 207. The server then receives the changed selections in step 207, determines an offering price for the changed selections in step 209, and conveys the offering price and the incremental upgrade prices in steps 211 and 213, as describe above. This loop continues until the customer decides not to make further selection changes.

Once the customer is satisfied with the product selection, and decides not to make further changes, a fourth web page provides an opportunity for the customer to purchase the selected products in step 217. If the customer decides not to purchase the products at that time, a fifth web page thanks the customer for shopping in step 223. If the customer does decide to purchase the selected products, then, in step 221, the server generates a sixth web page that contains a purchase order for the selected products and sends the web page to the customer's terminal. The customer then fills in and submits the required billing information. Finally, the sever generates a seventh web page that summarizes the transaction and thanks the customer for shopping. It should be understood that the customer can exit the process at any time (e.g. by closing the browser window).

Figure 3:
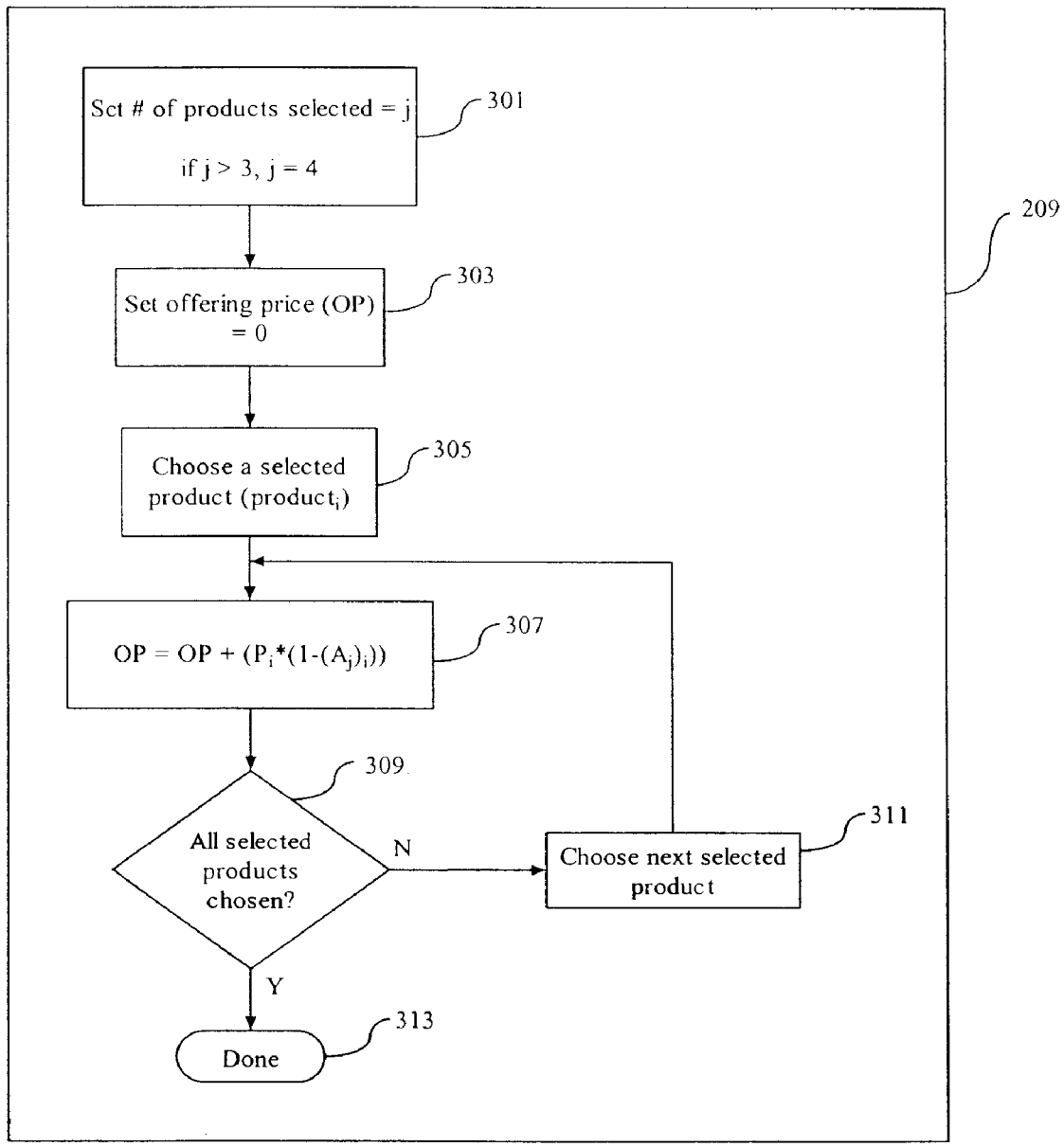
FIG. 3 is a flowchart illustrating the logical steps of a method to calculate an offering price according to the present invention.

Step 209 in FIG. 2 comprises the determination of an offering price for a selection of products. FIG. 3 is a more detailed view of step 209, and is a representation of a method in accordance with the invention for determining an offering price. As one of ordinary skill in the art will appreciate, the approach to implementing a variable pricing structure depicted in FIG. 3 represents one of several possible approaches.

One embodiment for implementing a variable pricing structure requires construction of a data table, such as the one shown in FIG. 4. Such a data table is a predetermined reference that enables the server 109 to look up a price component for computation of an offering price for a selection of products. Referring to FIG. 4, the first column 401 is the name of the product, and the second column 403 is the product's base price. The third, fourth, and fifth columns 405, 407, and 409, are discount rates applied to a particular product, if the total number of products purchased is respectively 2, 3, or more than three. It will be appreciated that in other embodiments, such a data table may have additional columns containing additional discount rates, to reflect a vendor's desire to incent customers to purchase a greater number of products. The current example of a data table is limited to three such columns for the sake of simplicity. In one embodiment, the data table may be located on the server 109. Further, the data table may be dynamic, in that it may be changed to reflect updated pricing or discount rates.

In one embodiment, there may be several price data tables, and the particular price data table employed to determine an offering price may be chosen based on characteristics associated with the customer. For example, a customer may have a unique customer identifier, and there may be a table where unique customer identifiers, and characteristics associated with the respective customers are stored. Such a unique identifier table may be located on the server 109. Characteristics recorded in such a unique identifier table may include the geographic region in which the customer resides, or a record of prior purchases made by the customer. If a customer previously purchased goods, the table used to determine an offering price may contain greater discount rates than a table used for a new customer. Or, if a vendor desires to increase market share in a particular geographic region, and the customer resides in that region, the table used to determine an offering price may contain greater discount rates than a table used for customer's not residing in that particular region.

An offering price may be expressed mathematically as $$OP = \sum_{i=1}^{n} S_i P_i (1 - (A_j)_i) \text{ where:}$$

OP is the offering price;
i is the product number;
$S_i$ is a switch that has a value of 1 if the $i^{th}$ product is selected, and a value of 0 if the $i^{th}$ product is not selected;
$P_i$ is the Base Price of the $i^{th}$ product; and
$A_j$ is the discount rate, where "j" represents the number of selected products. For example, referring to FIG. 4, if the second product 411 (Telephone 2) is one of three selected products, the discount rate for the second product $((A_3)_2)$ is 15%, and the component of the offering price representing Telephone 2 is: 1*80.00*(1−0.15)=$68.00. For illustrative purposes in the following discussion, it assumed that a customer selected three products: a pager 413 (i=3), local-telephone-service 415 (i=6), and paging service 423 (i=17).

Referring to FIG. 3, in step 301, the server sets variable "j" to the number of products selected. The number of products selected was determined through standard software techniques from the information received in step 207. (In the current example, the customer selected three products, thus, j=3). If the number of products selected is greater than three, the server sets variable "j" to four. In step 303, the server initializes the offering price variable OP by setting it to zero. This step ensures that the offering price only contains components from the current selection.

In Step 305 the server chooses one of the customer selected products. The order of choice is unimportant, thus any selected product may be chosen. The server is in communication with a price data table and looks up the appropriate values for calculations. In this example, the server chooses the pager, thus i=3, and $((A_3)_3)$=15%. In step 307, the server adds the pager component of the offering price to the existing offering price. (OP=0+(6.00*(1−0.15))=$5.10). In step 309, the server determines whether all selected products have been chosen. If not, then in step 311, the server chooses a customer selected product that has not been previously chosen, and loops back to step 307. This loop continues until the server chooses all of the selected products. Thus, in the second iteration of the current example, the server adds the local-telephone-service component to the offering price: i=6, $((A_3)_6)$=7.5%, and OP=$5.10+(13.00*15(1−0.075))=$17.13. In the third iteration, the server chooses the last of the selected products, and adds the paging service component to the offering price: i=17, $((A_3)_{17})$=35%, and OP=$17.13+(10.00*(1−0.35))=$23.63. Once all selected products have been chosen in step 309, the process is completed 311 and the server conveys the offering price of $23.63 to the customer in step 211.

In the example above, the discount on selected hardware represents a one time discount, and the discount on services runs for the length of the service. In one embodiment, the method and system interact with a database containing customer and account information, such that existing customers may receive the variable pricing benefit if they choose to purchase additional products.

In an alternative embodiment, the invention is encoded in an application running on a networked user terminal, or in a client/server environment, run on a server and accessed from a networked user terminal. As a further alternative embodiment, the invention may be implemented by a customer service representative (CSR) over the telephone. For example, the CSR is in communication with a user terminal, such as 105a, and may initiate telephone contact with a customer. The call may also be initiated by the customer. The CSR brings up the fist web page and conveys several pieces of information to the customer: first, the available products and the associated base prices; second, a message indicating that any combination of products is available to the customer, and that a greater discount will result if more products, or more expensive products are selected. Following this, the CSR elicits information from the customer about the customer's current or intended usage patterns for the products. The CSR then enters the information in the first web page and submits it to the server.

Next, the server 109 sends a second web page to the CSR's user terminal 105a with product recommendations for the customer. The CSR conveys these recommendations to the customer and elicits the customer's product selection. The CSR then enters the customer's selection on the second web page and submits the selection to the server. The server 109 determines an offering price for the customer's selections as described above, and sends a third web page to the CSR's terminal with the offering price, the amount of discount, and the incremental price of upgrades to the customer's selection. Also presented in the third web page is opportunity to make a change to the selection. The CSR conveys this information to the customer and asks if the customer would like to make any changes.

Once the customer is satisfied with the product selection, the CSR clicks on a button, and the server 109 generates a fourth web page and sends it to the user terminal 105a. The fourth web page presents the opportunity to purchase the selected products. The CSR asks if the customer would like to purchase the selected products. If the customer declines, the CSR thanks the customer and ends the telephone call. If the customer accepts, the CSR clicks on a button, thereby indicating to the server 109 that the customer wishes to purchase the selected products. In response, the server 109 generates a fifth web page that contains a purchase order for the selected products, and sends it to the user terminal 105a. The CSR elicits the necessary billing information from the customer and enters the information in the fifth web page. After the CSR submits the fifth web page to the server, the server generates and sends to the user terminal 105a, a summary of the transaction. The CSR conveys this summary to the customer, thanks the customer for their business and ends the telephone call.

As yet a further alternative embodiment of the present invention, a kiosk accessible by the public may contain computer hardware sufficient to run a software embodiment of the invention and communicate purchase orders to a vendor. Such a kiosk may also contain a video display and an input device, such as a keyboard, to enable customer interaction. For example, a user terminal 105a connected to a communication network 103 may be configured as a kiosk accessible by the public, such as in a shopping mall. The connection 107a to the network 103 may be a modem and a telephone line, or a broadband network connection. Interactions between a customer, user terminal 105a, and the server 109 may occur as previously described. Such an embodiment may increase public exposure for the vendor, and enable greater access to the vendor's products to population segments not having readily available computer access.

It will be apparent to those of ordinary skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

That which is claimed:

1. A computer-implemented method for conveying sales options, the method comprising:
    offering a plurality of products to a customer;
    receiving from the customer an initial selection of a subset of the products;
    determining, by a server, an offering price for the initial selection by summing a base price for each product of the initial selection reduced by a discount determined by summing a discount for each product of the initial selection, wherein a variable characteristic determines the discount for each product of the initial selection;
    presenting the offering price to the customer;
    providing an opportunity for the customer to change the initial selection to a changed selection that includes another product;
    upon receiving from the customer a request to change the initial selection, determining, by the server, a new offering price for the customer's changed selection;
    presenting the new offering price to the customer; and
    presenting to the customer an incremental upgrade price of the changed selection in addition to the new offering price for the changed selection, so that the customer may see the incremental cost of including the other product in the changed selection.

2. The method of claim 1, wherein the variable characteristic of the discount comprises:
    providing a greater discount upon selection of at least one of a greater number and a higher level of products.

3. The method of claim 1, further comprising:
    receiving information about customer usage of the plurality of products; and
    determining the variable characteristic of the discount based on the received information about customer usage.

4. The method of claim 1, wherein the variable characteristic of the discount comprises the number of products in the selections.

5. The method of claim 1, wherein the variable characteristic of the discount comprises information about the geographic region in which the customer resides.

6. The method of claim 1, wherein the variable characteristic of the discount comprises information about goods previously purchased by the customer.

7. The method of claim 1, wherein offering the plurality of products to the customer, receiving from the customer the initial selection, presenting the offering price to the customer, receiving a request to change the initial selection, presenting the new offering price, and presenting the incremental upgrade price, take place over a communication network.

8. A server configured for conveying sales options, the server comprising:
    a processor;
    computer readable media, accessible to the processor, including program instructions, executable by the processor, wherein the program instruction include instructions for:
        offering a plurality of products to a customer;
        receiving from the customer an initial selection of a subset of the products;
        determining an offering price for the initial selection by summing a base price for each product of the initial selection reduced by a discount determined by summing a discount for each product of the initial selection, wherein a variable characteristic determines the discount for each product of the initial selection;
        presenting the offering price to the customer;
        providing an opportunity for the customer to change the initial selection to a changed selection that includes another product;
        upon receiving from the customer a request to change the initial selection, determining a new offering price for the customer's changed selection;
        presenting the new offering price to the customer; and
        presenting to the customer an incremental upgrade price of the changed selection in addition to the new offering price for the changed selection, so that the customer may see the incremental cost of including the other product in the changed selection.

9. The server of claim 8, wherein the variable characteristic of the discount comprises:
    providing a greater discount upon selection of at least one of a greater number and a higher level of products.

10. The server of claim 8, wherein the program instructions include instructions for:
    receiving information about customer usage of the plurality of products; and determining the variable characteristic of the discount based on the received information about customer usage.

11. The server of claim 8, wherein the variable characteristic of the discount comprises the number of products in the selections.

12. The server of claim 8, wherein the variable characteristic of the discount comprises information about the geographic region in which the customer resides.

13. The server of claim 8, wherein the variable characteristic of the discount comprises information about goods previously purchased by the customer.

14. The server of claim 8, wherein the offering the plurality of products to the customer, receiving from the customer the initial selection, presenting the offering price to the customer, receiving a request to change the initial selection, presenting the new offering price, and presenting the incremental upgrade price, take place over a communication network.

15. A non-transitory computer readable medium including program instructions, executable by a processor, wherein the program instructions include instructions for:
    offering a plurality of products to a customer;
    receiving from the customer an initial selection of a subset of the products;
    determining an offering price for the initial selection by summing a base price for each product of the initial selection reduced by a discount determined by summing a discount for each product of the initial selection, wherein a variable characteristic determines the discount for each product of the initial selection;
    presenting the offering price to the customer;
    providing an opportunity for the customer to change the initial selection to a changed selection that includes another product;
    upon receiving from the customer a request to change the initial selection, determining a new offering price for the customer's changed selection;
    presenting the new offering price to the customer; and
    presenting to the customer an incremental upgrade price of the changed selection in addition to the new offering price for the changed selection, so that the customer may see the incremental cost of including the other product in the changed selection.

16. The computer readable medium of claim 15, wherein the variable characteristic of the discount comprises:
    providing a greater discount upon selection of at least one of a greater number and a higher level of products.

17. The computer readable medium of claim 15, wherein the program instructions include instructions for:
    receiving information about customer usage of the plurality of products; and
    determining the variable characteristic of the discount based on the received information about customer usage.

18. The computer readable medium of claim 15, wherein the variable characteristic of the discount comprises the number of products in the selections.

19. The computer readable medium of claim 15, wherein the variable characteristic of the discount comprises information about the geographic region in which the customer resides.

20. The computer readable medium of claim 15, wherein the variable characteristic of the discount comprises information about goods previously purchased by the customer.

* * * * *